(12) United States Patent  
Mori

(10) Patent No.: US 9,160,926 B2
(45) Date of Patent: Oct. 13, 2015

(54) IMAGE PROCESSING APPARATUS HAVING DISPLAY DEVICE, CONTROL METHOD THEREFOR, AND STORAGE MEDIUM

(71) Applicant: CANON KABUSHIKI KAISHA, Tokyo (JP)

(72) Inventor: Kurumi Mori, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 120 days.

(21) Appl. No.: 13/968,643

(22) Filed: Aug. 16, 2013

(65) Prior Publication Data

US 2014/0055656 A1    Feb. 27, 2014

(30) Foreign Application Priority Data

Aug. 21, 2012 (JP) ................................. 2012-182543

(51) Int. Cl.
*H04N 5/222* (2006.01)
*H04N 5/232* (2006.01)

(52) U.S. Cl.
CPC ................. *H04N 5/23293* (2013.01)

(58) Field of Classification Search
USPC .......................... 348/333.02, 333.01
See application file for complete search history.

(56) References Cited

FOREIGN PATENT DOCUMENTS

JP    2007-243923 A    9/2007

*Primary Examiner* — Roberto Velez
*Assistant Examiner* — Stephen Coleman
(74) *Attorney, Agent, or Firm* — Rossi, Kimms & McDowell LLP

(57) ABSTRACT

An image processing apparatus capable of reducing storage capacity and lightening processing loads while keeping visual quality of shooting information high. An output unit resizes a taken image into images with resolutions corresponding to respective resolutions of a plurality of image output destinations including a display unit and output the images at the same time. A superimposition unit individually superimposes shooting information corresponding to the respective resolutions of the plurality of image output destinations on the images. A control unit provides control such that the shooting information is superimposed on the image output to the display unit and a selected image output destination and the output unit outputs the same, and that the output unit outputs the image to an image output destination that has not been selected without superimposing the shooting information on the image.

15 Claims, 7 Drawing Sheets

IMAGE PROCESSING APPARATUS HAVING DISPLAY DEVICE, CONTROL METHOD THEREFOR, AND STORAGE MEDIUM

BACKGROUND OF THE INVENTION

1. Field of the Invention

The present invention relates to an image processing apparatus, a control method therefor, and a computer-readable storage medium storing a program for implementing the control method, and in particular to a display control technique for use in displaying a variety of information as well as images on a display which the image processing apparatus has.

2. Description of the Related Art

In recent years, the resolution of images during video shooting by video cameras have been continuously increasing from Standard Definition (SD) to High Definition (HD) and further to 4K or Super High-Definition (SHD). It should be noted that 4K is a video format with a screen resolution of approximately 4000 horizontal pixels by 2000 vertical pixels, and examples thereof include a resolution of 4096×2160/24p defined by DCI (Digital Cinema Initiatives). In step with this trend, not only HD televisions but also 4K televisions have come along as ordinary televisions, and environments from shooting to viewing have been improving.

On the other hand, there are image pickup apparatuses whose main body is equipped with displays such as a panel monitor and a viewfinder, which display an image being taken, so that during actual shooting, a user can check the angle of view and the brightness of an image being taken. Also, there are known image pickup apparatuses which have a video output terminal for outputting an image being taken to a relatively large external monitor so that details of an image being taken such as image quality can be checked. In either arrangement, when an image being taken is to be displayed on each of the panel monitor, the viewfinder, and the external monitor, which are image output destinations, information for grasping various statuses during shooting (hereafter referred to as "shooting information") when necessary needs to be displayed in a superimposed manner.

The panel monitor, the viewfinder, and the external monitor have different resolutions in many cases, and it is thus necessary to resize an image according to image output destinations. When decimation or interpolation is performed in such resizing, degradation of quality such as streaking or blurring of straight lines or the like with clear brightness and color difference which are used for characters that represent shooting information, or turning-off of display may be more likely to occur particularly in a taken image that does not have a fine gradation.

To prevent this problem, superimposition data for shooting information is created in advance with respect to image output destinations in accordance with resolutions thereof, and shooting information is displayed using the corresponding superimposition data in a manner being superimposed on an image being taken, which is to be displayed on the mage output destination, in many cases.

On the other hand, as a method to display shooting information superimposed on an image while maintaining quality in accordance with resolutions of image output destinations, there has been proposed a method that generates font information, which is suited to a plurality of resolutions, from one piece of font data (see Japanese Laid-Open Patent Publication (Kokai) No. 2007-243923). According to this method, from one piece of font data, thick-line font data is generated in a case where resizing is to be performed for a small screen, and font data with an optimum design is generated in a case where resizing is to be performed for a large screen.

However, according to the method that creates superimposition data for shooting information with respect to image output destinations and in accordance with resolutions of the image output destinations, the amount of data increases with an increase in the number of image output destinations and hence high-capacity ROM or RAM is required so as to hold superimposition data. Moreover, a problem of an increase in the load of a display signal generation process carried out by a control circuit of an apparatus main body so as to superimpose superimposition data on an image arises.

On the other hand, the technique described in Japanese Laid-Open Patent Publication (Kokai) No. 2007-243923 can reduce the storage capacity of ROM, RAM, or the like, which stores display fonts which are superimposition data.

Display fonts created using the method described in Japanese Laid-Open Patent Publication (Kokai) No. 2007-243923, however, are not completely suited to resolutions of image output destinations. For this reason, the quality of shooting information displayed when resizing is performed as a result is worse compared to the method that creates superimposition data in advance according to resolutions of image output destinations. Moreover, generation of data for displaying shooting information is required for each of image output destinations, and this process as well as a process to generate font data for respective resolutions from one piece of font data brings about an increase in processing loads on the control circuit of the apparatus main body.

SUMMARY OF THE INVENTION

The present invention provides an image processing apparatus capable of reducing the storage capacity of a storage unit, which stores data, and lightening processing loads on a control circuit in an apparatus main body while keeping the visual quality of shooting information high, a control method therefor, and a computer-readable storage medium storing a control for implementing the control method.

Accordingly, a first aspect of the present invention provides an image processing apparatus comprising an image pickup unit configured to take an image, a peep-type finder, a display unit which is provided in a part other than inside the peep-type finder, an output unit configured to resize the image, which is taken by the image pickup unit, into images with resolutions corresponding to respective resolutions of three or more image output destinations including the display unit and output the images to the three or more image output destinations at the same time, a superimposition unit configured to individually superimpose shooting information in the resolutions corresponding to the respective resolutions of the three or more image output destinations on the images output to the respective three or more image output destinations, a selection unit configured to select an image output destination, on which the shooting information is to be superimposed, from among a plurality of image output destinations except the display unit among the three or more image output destinations, and a control unit configured to provide control such that the superimposition unit superimposes the shooting information on the image output to the display unit and the image output to the image output destination selected by the selection unit, the output unit outputs the same, and that the output unit outputs the image to an image output destination that has not been selected by the selection unit without superimposing the shooting information on the image.

Accordingly, a second aspect of the present invention provides A control method for an image processing apparatus having an image pickup unit that takes an image, a peep-type finder, a display that is provided in a part other than inside the peep-type finder, and an output unit that outputs the images to three or more image output destinations including the display unit, comprising a selection step of selecting an image output destination, on which shooting information is to be superimposed, from among a plurality of image output destinations except the display unit among the three or more image output destinations, an output step of resizing the image, which is taken by the image pickup unit, into images with resolutions corresponding to respective resolutions of the three or more image output destinations and outputting the images to the three or more image output destinations at the same time, a superimposition step of individually superimposing shooting information in the resolutions corresponding to the respective resolutions of the display unit and the image output destination selected in the selection step on the images output to respective ones of the display unit and the image output destination selected in the selection step, and a control step of providing control such that in the superimposition step, the shooting information is superimposed on the image output to the display unit and the image output to the image output destination selected in the selection step, and the images with the shooting information is superimposed thereon are output, and that the image is output to an image output destination that has not been selected in the selection step without superimposing the shooting information on the image.

Accordingly, a third aspect of the present invention provides a non-transitory computer-readable storage medium storing a program for causing a computer to implement a control method for an image processing apparatus having an image pickup unit that takes an image, a peep-type finder, a display that is provided in a part other than inside the peep-type finder, and an output unit that outputs the images to three or more image output destinations including the display unit, the control method comprising a selection step of selecting an image output destination, on which shooting information is to be superimposed, from among a plurality of image output destinations except the display unit among the three or more image output destinations, an output step of resizing the image, which is taken by the image pickup unit, into images with resolutions corresponding to respective resolutions of the three or more image output destinations and outputting the images to the three or more image output destinations at the same time, a superimposition step of individually superimposing shooting information in the resolutions corresponding to the respective resolutions of the display unit and the image output destination selected in the selection step on the images output to respective ones of the display unit and the image output destination selected in the selection step, and a control step of providing control such that in the superimposition step, the shooting information is superimposed on the image output to the display unit and the image output to the image output destination selected in the selection step, and the images with the shooting information is superimposed thereon are output, and that the image is output to an image output destination that has not been selected in the selection step without superimposing the shooting information on the image.

According to the present invention, while the visual quality of shooting information can be kept high, the storage capacity of a storage unit, which stores data, can be reduced, and processing loads on a control circuit in an apparatus main body can be lightened.

Further features of the present invention will become apparent from the following description of exemplary embodiments (with reference to the attached drawings).

DESCRIPTION OF THE EMBODIMENTS

The present invention will now be described in detail with reference to the drawings showing embodiments thereof. Here, a digital video camera (hereafter referred to as "the video camera"), which is an exemplary image pickup apparatus, is used as an image processing apparatus according to the present invention.

Figure 1:
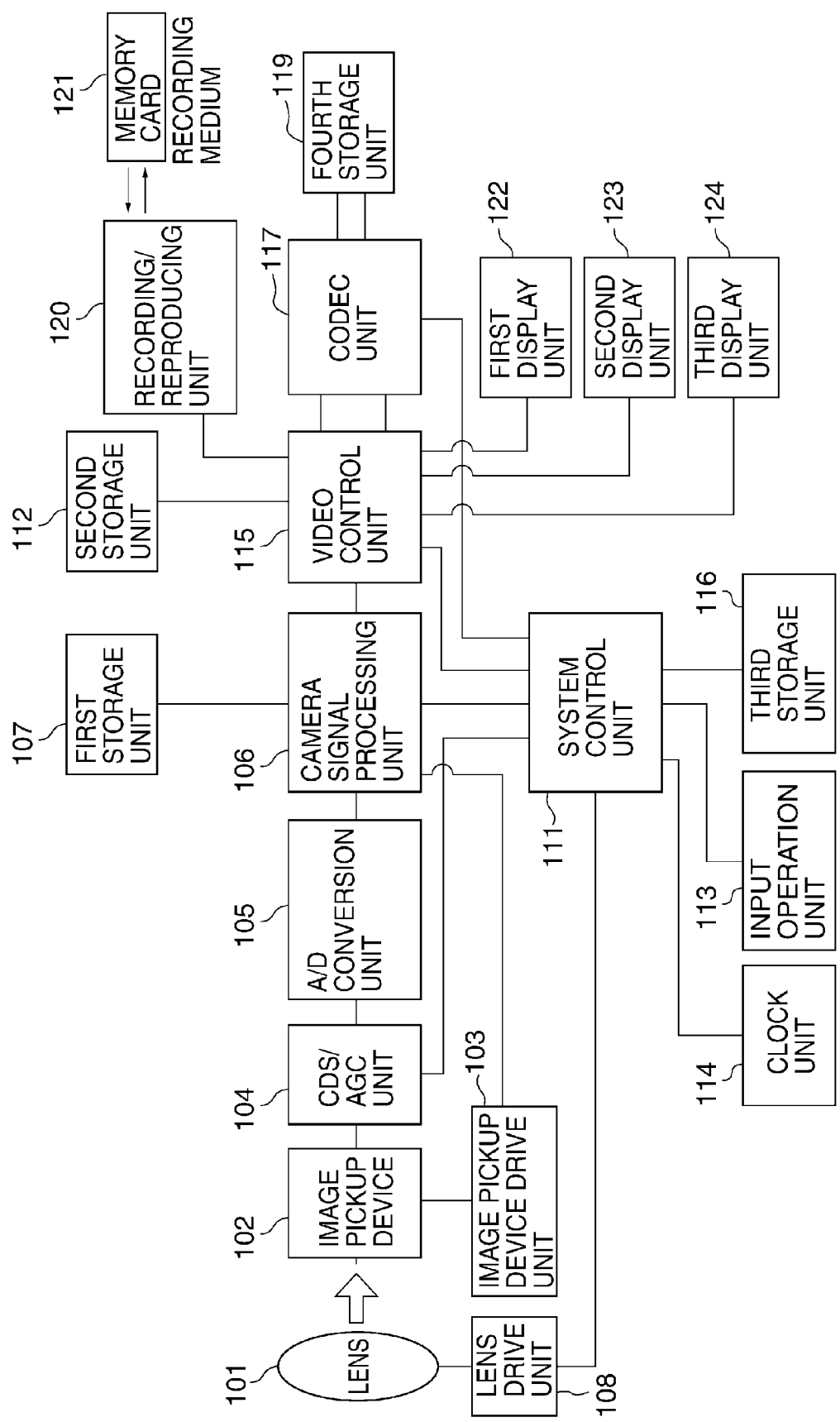
FIG. 1 is a block diagram schematically showing an arrangement of a video camera which is an exemplary image pickup apparatus according to embodiments of the present invention.

FIG. 1 is a block diagram schematically showing an arrangement of the video camera according to embodiments of the present invention. It should be noted that the block diagram of FIG. 1 is common to a first embodiment and a second embodiment, to be described later.

The video camera has a lens unit 101 which is an image pickup unit, an image pickup device 102, and an image pickup device drive unit 103. The lens unit 101 constitutes an optical system that forms an image on a light-incident surface of the image pickup device 102, and has a zooming function, a focusing adjusting function, and a diaphragm adjusting function. The image pickup device 102 has an arrangement in which a number of photoelectric conversion elements are arranged in a two-dimensional manner, and converts an optical image of a subject formed by the lens unit 101 into video signals on a pixel-by-pixel basis. The image pickup device 102 also has an electronic shutter function which adjusts the time period for which electric charge is accumulated by the photoelectric conversion elements. The image pickup device 102 is, for example, a CMOS (complementary metal-oxide semiconductor) image sensor or a CCD (charge-coupled device) image sensor. The image pickup device drive unit 103 drivingly controls the image pickup device 102 in accordance with timing controlled by a camera signal processing unit 106.

The video camera also has a CDS/AGC unit 104, an A/D (analog-to-digital) conversion unit 105, and the camera signal processing unit 106. The CDS/AGC unit 104 reduces noise by subjecting an analog video signal from the image pickup device 102 to correlated dual sampling, and under the control of a system control unit 111, to be described later, provides gain control (AGC) of the signal level. The A/D conversion unit 105 converts the analog video signal from the CDS/AGC unit 104 into a digital video signal and supplies the digital video signal to the camera signal processing unit 106. The camera signal processing unit 106 obtains an AF evaluation value, an AE evaluation value, and so on based on the supplied digital video signal, and on this occasion, uses a first storage unit 107, to be described later, as a frame memory in subjecting a taken image to signal processing.

The video camera has the first storage unit 107, a second storage unit 112, a third storage unit 116, and a fourth storage unit 119. Here, for the sake of convenience, the first storage unit 107, the second storage unit 112, the third storage unit 116, and the fourth storage unit 119 are separately provided independently of one another so as to be used for camera signal processing, video control, system control, and CODEC, respectively. The arrangement of the storage units, however, is not limited to this, but functions of these four storage units may be physically realized by a single storage device. The first storage unit 107, the second storage unit 112, the third storage unit 116, and the fourth storage unit 119 are each typically comprised of a readable and writable semiconductor memory, but at least one of them may be comprised of another storage device (such as a hard disk).

The video camera has a lens drive unit 108, the system control unit 111, an input operation unit 113, and a clock unit 114. Under the control of the system control unit 111, the lens drive unit 108 drives a motor, an actuator, and so on, not shown, which the lens unit 101 has, to adjust zoom rate and focus and control exposure. The lens drive unit 108 is controlled by the system control unit 111 based on results of signal processing by the camera signal processing unit 106. For example, at the time of AF control, the system control unit 111 controls the lens drive unit 108 based on an AF evaluation value obtained by the camera signal processing unit 106, to drivingly control a focus adjusting lens, not shown, which the lens unit 101 has, so that the lens 101 can be focused on a subject.

On the other hand, when a manual focus mode in which the focus of the lens unit 101 is manually adjusted is set, the system control unit 111 detects a focus adjusting operation by a user. Specifically, the system control unit 111 detects an operation of a switch or a lever for adjusting focal length included in the input operation unit 113, or a focus ring provided on an outer periphery of a lens barrel of the lens unit 101. The system control unit 111 changes the focal length of the lens unit 101 by controlling the lens drive unit 108 based on a moving direction and a travel distance of a focus in accordance with the detected operation. It should be noted that in a case where the focal length of the lens unit 101 is mechanically changeable by a switch, a lever, or the like operated by the user, involvement by the system control unit 111 and the lens drive unit 108 is not required.

The system control unit 111, which is, for example, a CPU, expands programs stored in ROM of the third storage unit 116 into a work area of RAM of the third storage unit 116 and executes them to control the overall operation of the video camera including a process to display a variety of information, to be described later. It should be noted that the third storage unit 116, which includes ROM and RAM, stores programs to be executed by the system control unit 111, various settings, initial values, and so on, and is used as a work area for the system control unit 111.

The input operation unit 113, which is a user interface for the user to give instructions to the video camera, has input devices such as keys, buttons, and a touch panel. The input operation unit 113 includes a select button and a confirm button for use in configuring various settings through menu operation or the like. The input operation unit 113 also includes a shutter button for still image shooting, an MF ring, a zoom switch, a diaphragm adjusting dial, and so on. The clock unit 114 has a real-time clock (RTC) and a battery for backup and sends date and time information in response to a request from the system control unit 111.

The video camera has a video camera control unit 115, a codec unit 117, a recording/reproducing unit 120, a first display unit 122, a second display unit 123, and a third display unit 124. The video control unit 115 adjusts hue, color saturation, and lightness in color for the first display unit 122, the second display unit 123, and the third display unit 124, provides display control including superimposed display of various information, and further performs, for example, control over the recording/reproducing unit 120. The video control unit 115 also carries out, for example, resolution conversion of video signals for various video output systems including the first display unit 122, the second display unit 123, and the third display unit 124. The video control unit 115 controls OSD (On-Screen Display) displays such as shooting information and user setting menus. The video control unit 115 users the second storage unit 112 as a frame memory, a work memory, and so on in performing signal processing associated with video base band signals. It should be noted that the second storage unit 112 is also used as frame memory or the like when the video control unit 115 generates superimposition data, which is to be superimposed on images displayed on the first display unit 122, the second display unit 123, and the third display unit 124, according to resolutions of the respective display units.

The codec unit 117 performs encoding/decoding of moving images and others. MPEG (Motion Picture Experts Group)-2 is used as an encoding/decoding format. The encoding/decoding format, however, is not limited to this, but may be another format, or JPEG 2000, PNG, or the like for still images. The codec unit 117, which is connected to the video control unit 115, performs encoding/decoding in accordance with instructions from the video control unit 115. At the time of performing encoding/decoding of video signals, the codec unit 117 uses the fourth storage unit 119 as frame memory or the like.

The recording/reproducing unit 120 records recording data, which has been encoded by the video control unit 115 and the codec unit 117 and processed as a recording format, in a memory card 121, which is an exemplary recording medium, and also, reads out the recording data from the memory card 121. It should be noted that the memory card 121 is able to be attached to and removable from a card slot, not shown, provided in a main body of the video camera.

The first display unit 122, the second display unit 123, and the third display unit 124 act as respective displays to display same information. Here, the first display unit 122 is a panel monitor such as an LCD with a size of several inches, which is openably and closably provided as a main body display unit on a side face of the main body of the video camera. The second display unit 123 is a display smaller than the first display unit 122 and is an EVF provided inside a peep-type finder. The third display unit 124 is an interface (I/F) for output to an external monitor larger than the first display unit 122, and is, for example, an output terminal such as an HDMI or an SDI. It should be noted that the first display unit 122, the second display unit 123, and the third display unit 124 are each capable of displaying images input from the image pickup device 102 and enlarged images and act as so-called viewfinders.

Figure 2:
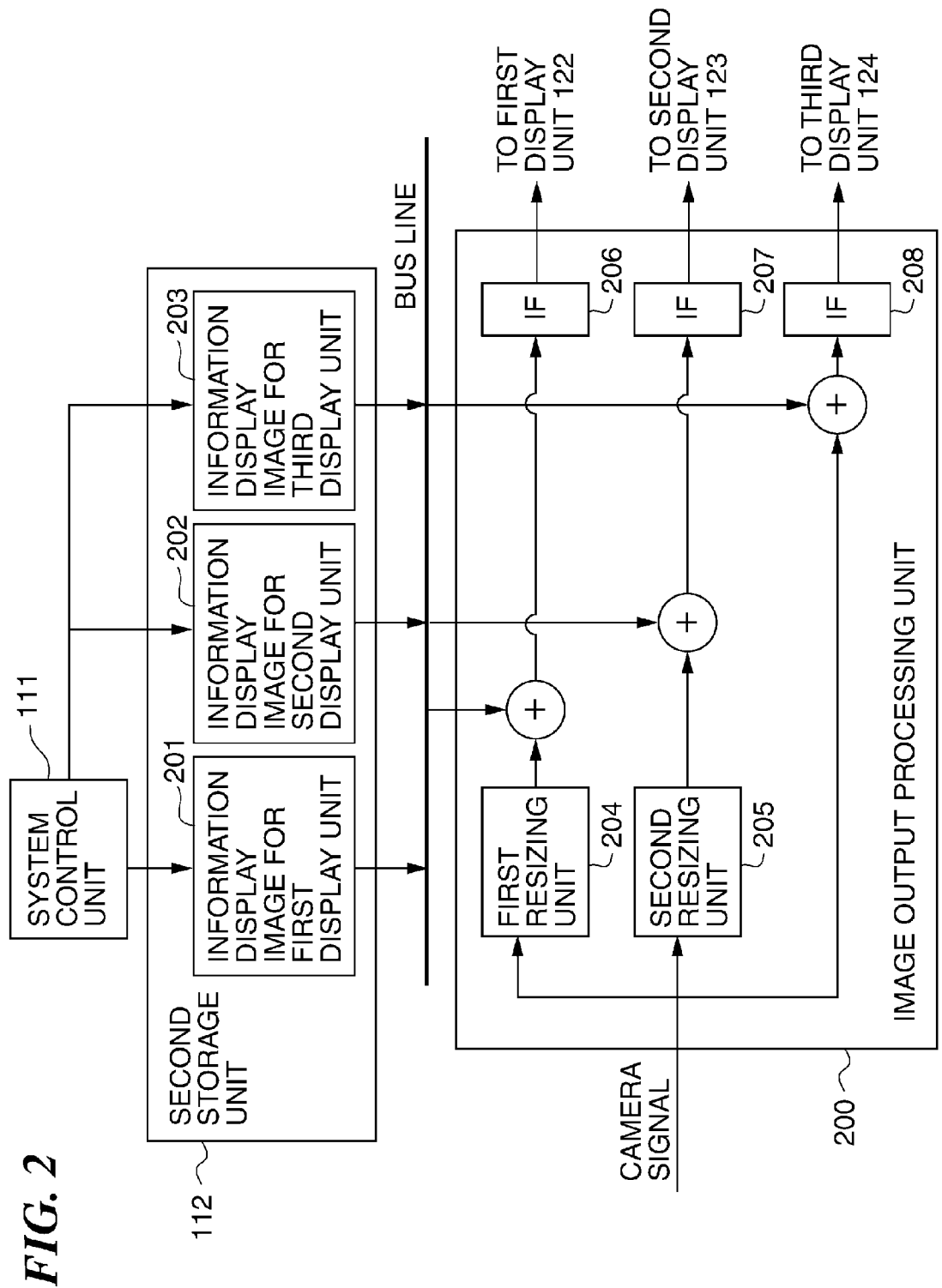
FIG. 2 is a block diagram schematically showing an arrangement of an image output processing unit according to a first embodiment, which a video control unit constituting the video camera appearing in FIG. 1 has.

FIG. 2 is a block diagram schematically showing an arrangement of an image output processing unit 200 according to a first embodiment, which the video control unit 115 has. The image output processing unit 200, which the video control unit 115 has, is provided with a first resizing unit 204 and a second resizing unit 205 which subject a camera signal, which is supplied from the camera signal processing unit 106, to resizing processes suited to respective resolutions (powers) of the first display unit 122 and the second display unit 123. It should be noted that the camera signal subjected to the resizing processes by the first resizing unit 204 and the second resizing unit 205 is output to the first display unit 122 and the second display unit 123 at the same time.

In accordance with the resizing process by the first resizing unit 204, the system control unit 111 write information display images 201 suited to resolutions of the first display unit 122 in memory of the second storage unit 112. It should be noted that the information display images 201 are formed by rendering shooting information for grasping shooting statuses and shooting conditions as images when images are taken, and information display images 202 and 203, to be described later, as well conform to the information display images 201.

When information is to be displayed on the second display unit 123, the system control unit 111 writes the information display images 202 suited to resolutions of the second display unit 123 in memory of the second storage unit 112 in accordance with the resizing process by the second resizing unit 205. When information is to be displayed on the third display unit 124, the information display images 203 suited to resolutions of the third display unit 124 is stored in memory of the second storage unit 112.

It should be noted that the information display images 201 to 203 are generated at a ratio which is an integral submultiple of respective resolutions of the first to third display units 122 to 124. For this reason, the information display images 201 to 203 can be displayed in a superimposed manner without performing interpolation on display dots on display screens of the first to third display units 122 to 124. As a result, high-quality displays can be produced without blurring or streaking.

The image output processing unit 200 outputs image data comprised of the information display images 201 superimposed on the camera signal resized by the first resizing unit 204 to the first display unit 122 via an output I/F 206. Likewise, image data comprised of the information display images 202 superimposed on the camera signal resized by the second resizing unit 205 to the second display unit 123 via an output I/F 207. On the other hand, because the third display unit 124 is for output to an external monitor, the image output processing unit 200 outputs image data comprised of the information display images 203 superimposed on the camera signal to the third display unit 124 via an output I/F 208.

Figure 3:
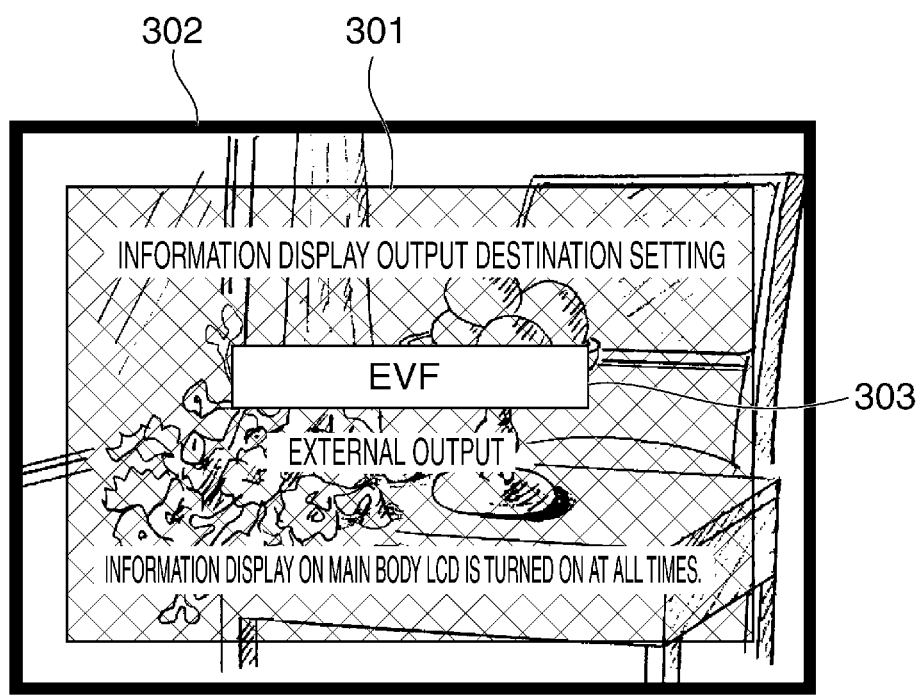
FIG. 3 is a view showing an exemplary screen layout on an output setting menu screen called by an input operation unit constituting the video camera appearing in FIG. 1.

FIG. 3 is a view showing an exemplary screen layout of an output setting menu screen called from the third storage unit 116 by the system control unit 111 using the input operation unit 113. Here, from among the three image output destinations (the first to third display units 122 to 124), one of the second display unit 122 and the third display unit 124 other than the first display unit 122 which is the main body display unit is selectable as an image output destination for superimposed information display images. Only a camera signal is output to an image output destination that has not been selected. The first display unit 122 always displays a camera signal on which the information display images 201 are superimposed. It should be noted that in the present embodiment, there are three image output destinations consisting of the first to third display units 122 to 124, but when there are four or more image output destinations, one of three or more image output destinations other than the first display unit 122 is rendered unselectable. As a result, the remaining two or more image output destinations are selectable as image output destinations for superimposed information display images.

The output setting menu screen appearing in FIG. 3 is a screen for the user to select either one of an EVF and an external output as an image output destination on which information display images are superimposed, and here, a state in which the EVF is selected is shown in the figure. The EVF corresponds to the second display unit 123, and the external output corresponds to the third display unit 124. A setting display 301 on the output setting menu screen is a type of an information display image and displayed in a manner being superimposed on an image 302 of a camera signal. The setting display 301 is displayed in a superimposed manner on both of the first display unit 122 and the image output destination selected on the screen in FIG. 3.

When the user opens the output setting menu screen in FIG. 3 for the first time, the EVF (the second display unit 123) is selected as a default setting. Because not the external monitor for which whether or not it is connected is unknown at the time of shooting but the EVF which is frequently used and displayed with reliability, operability of the video camera is enhanced.

On the output setting menu screen in FIG. 3, the user can select an image output destination for information display images by moving a cursor 303 through operation of a cross key or the like provided in the input operation unit 113. Then, by depressing a confirm button provided in the input operation unit 113, the user can decide the image output destination. Through such operation, information display images can be superimposed on the external monitor in place of the EVF.

On the output setting menu screen, a guide to the effect that information display on the main body display unit (the first display unit 122) is on at all times is displayed, making it clear that information display images are always displayed on the main body display unit. In the present embodiment, the user cannot select the main body display unit as a display unit on which information is not to be displayed because the main body display unit is used with the highest frequency, and information display is essential in terms of camera operation.

The image output destination selected on the output setting menu screen is recorded as a setting value in the third storage unit 116. When the image output destination set on the output setting menu screen is different from the previous image output destination, information to the effect that settings have been changed is recorded (for example, a setting change flag is set) in work memory of the third storage unit 116.

Figure 4:
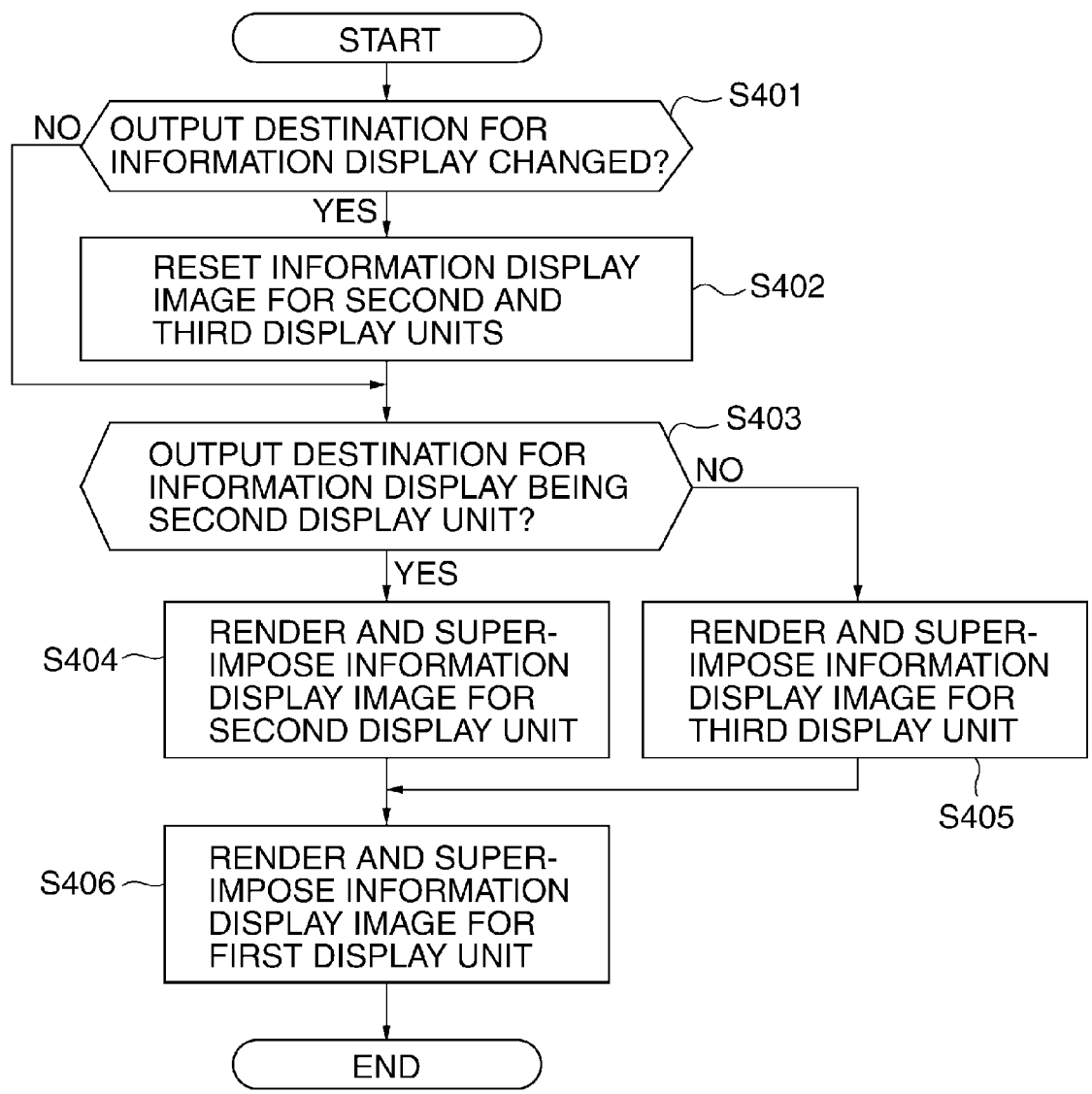
FIG. 4 is a flowchart of an information display image superimposed display process carried out by the image output processing unit appearing in FIG. 2.
Figure 5A:
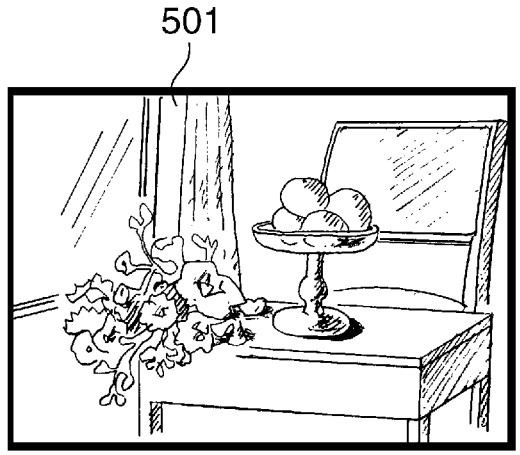
FIGS. 5A to 5C are exemplary screens displayed on a second display unit and a third display unit in steps S404 and S405 in FIG. 4, and an exemplary screen layout on the third display unit in a case where information display images are displayed on both the second display unit and the third display unit.
Figure 5B:
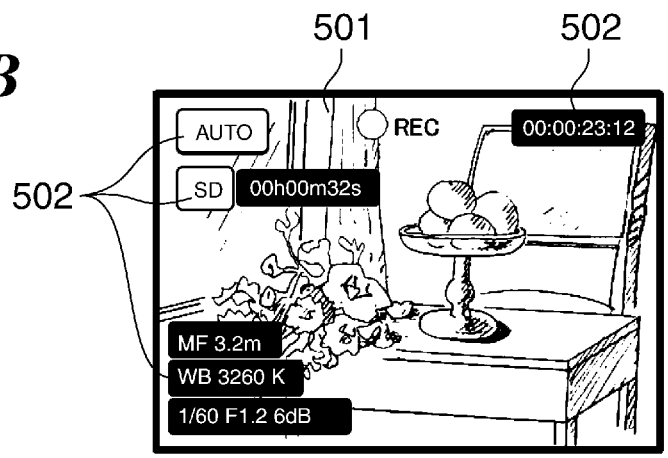
Figure 5C:
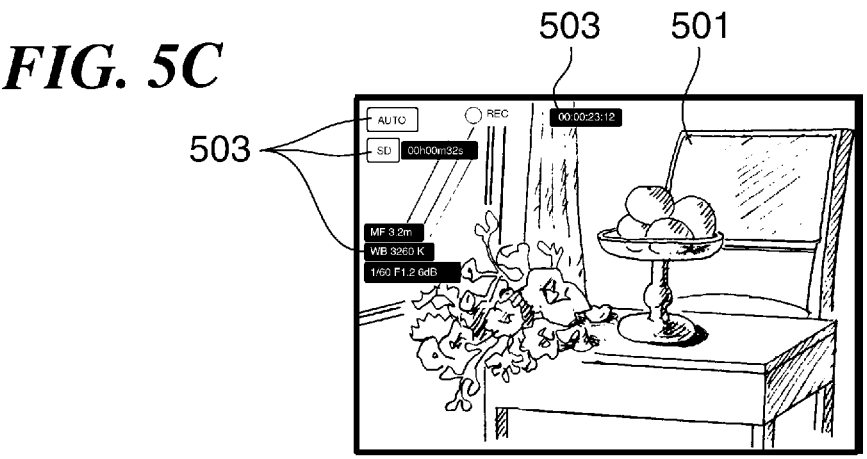

FIG. 4 is a flowchart of an information display image superimposed display process carried out by the image output processing unit 200. FIGS. 5A to 5C are views showing exemplary screens displayed on the first to third display units 122 to 124 in steps S404 and S405 in FIG. 4, and an exemplary screen layout on the third display unit 124 in a case where information display images are displayed on both the second display unit 123 and the third display unit 124.

The process in FIG. 4 is carried out at regular intervals when the video camera is operating in a shooting mode and images (through-the-lens images or camera signal images) taken by the image pickup device 102 are successively displayed on the first display unit 122 and a predetermined display unit. This process is realized by the system control unit 111 expanding a program, which is stored in ROM of the third storage unit 116, into work memory and executing the same to control operation of the image output processing unit 200.

First, in step S401, by referring to the third storage unit 116, the system control unit 111 determines whether or not an image output destination for information display images has been changed by a display on the previous output setting menu screen (for example, whether or not a setting change flag is recorded). When settings have been changed (YES in the step S401), the system control unit 111 proceeds to a process in step S402, and when settings have not been changed (NO in the step S401), the system control unit 111 proceeds to a process in step S403.

In the step S402, the system control unit 111 resets the information display images 202 for the second display unit 123 and the information display image 203 for the third display unit 124 to prevent intrusion of noise or the like before changing of image output destinations. The system control unit 111 then proceeds to the process in the step S403.

In the step S403, by referring to the third storage unit 116, the system control unit 111 determines whether or not a currently-set image output destination other than the first display unit 122 (an image output destination set on the output setting menu screen appearing in FIG. 3) is the second display unit 123. When the second display unit 123 is set (YES in the step S403), the system control unit 111 proceeds to a process in the step S404, and when the second display unit 123 is no set (NO in the step S403), the system control unit 111 proceeds to a process in the step S405.

In the step S404, the system control unit 111 performs rendering of the information display images 202 for the second display unit 123. As a result, as shown in FIG. 5B, information display images 502 corresponding to the information display images 202 described earlier with reference to FIG. 2 are displayed in a manner being superimposed on a camera signal 501. On the other hand, only a through-the-lens image represented by the camera signal 501, on which no information display images are superimposed, is displayed on the third display unit 124 as shown in FIG. 5A.

In the step S405, the system control unit 111 performs rendering of the information display images 203 for the third display unit 124. As a result, as shown in FIG. 5C, information display images 503 corresponding to the information display images 203 described earlier with reference to FIG. 2 are displayed in a manner being superimposed on the camera signal 501. On the other hand, only a through-the-lens image represented by the camera signal 501, on which no information display images are superimposed, is displayed on the second display unit 123 as shown in FIG. 5A.

After completing the process in the step S404 or S405, the system control unit 111 proceeds to a process in step S406, in which the system control unit 111 displays the information display images 201 in a superimposed manner on the first display unit 122, and thereafter, brings the process to an end. On the first display unit 122, the information display images 502 are displayed in a manner being superimposed on the camera signal 501 as shown in FIG. 5B.

It should be noted that when the resolution of the third display unit 124 is higher than that of the second display unit 123 (for example, the resolution of the second display unit 123 is WVGA (854×480), and the resolution of the third display unit 124 is FHD (1920×1080)), a process explained hereafter may be carried out. Namely, an option that enables selection of "both the EVF and the external monitor", that is, both the second display unit 123 and the third display unit 124 is added as an option of image output destinations to the output setting menu screen appearing in FIG. 3. When the option of "both the EVF and the external monitor" is selected, superimposition of information display images for the second display unit 123 having a lower resolution is done in the process in FIG. 4. Then, the information display images are output as they are to the third display unit 124 without resizing them and superimposed on a camera signal.

FIG. 5C shows an exemplary screen layout on the third display unit 124 in a case where information display images are displayed on both the second display unit 123 and the third display unit 124 (both the EVF and the external monitor). Referring to FIG. 5C, the information display images 503 with the same resolution as in FIG. 5B are displayed in a manner being superimposed on the camera signal 501 which is a taken image.

If a comparison between FIGS. 5B and 5C is made, the information display images 502 look larger than the information display images 503. This, however, is only because the entire screens in FIGS. 5B and 5C are illustrated with the same size although the resolution of the third display unit 124 is higher than that of the second display unit 123. Because the resolution of the third display unit 124 is higher than that of the second display unit 123, the information display images 502 and the information display images 503 are of the same size.

In the exemplary screen layout in FIG. 5C, information display images, because information display images to be displayed in a superimposed manner on the second display unit 123 are displayed as they are on the third display unit 124, they are displayed in a manner being concentrated in the upper left of the screen and are small with respect to the entire screen. However, an external monitor generally has a display area that is wide to a certain level, and thus even when the display size of information display images is small with respect to the entire screen, they can be visually recognized to a sufficient level.

When information display images to be displayed in a superimposed manner on the second display unit 123 are to be displayed as they are on the third display unit 124, resizing of the information display images is not required, and hence only a single information display image generation process is required. As a result, processing loads on the system control unit 111 can be lightened. Moreover, in a screen layout, information display images are concentrated along two sides (here, the left side and the upper side) with the same vertex (display reference point (origin)) therebetween with a central area important for framing, being circumvented. This ensures the ease of shooting.

Assuming that information display images are displayed along the right side as well as the left side and the upper side, information display images displayed along the right side in FIG. 5B are displayed around the center of the screen in FIG. 5C, and this obstructs visual recognition of a taken image. In the present invention, however, this problem does not arise.

A video camera according to the second embodiment differs from the video camera according to the first embodiment only in terms of the construction of an image output processing unit which the video control unit 115 has. Thus, the following description centers on the construction of an image output processing unit, and description of other component elements is omitted. It is assumed that the resolution of the second display unit 123 is QHD (960×540 which is a quarter of the resolution of the High Definition size). It is also assumed that the resolution of the third display unit 124 is FHD (a resolution of 1920×1080 which is the Full High Definition size).

Figure 6:
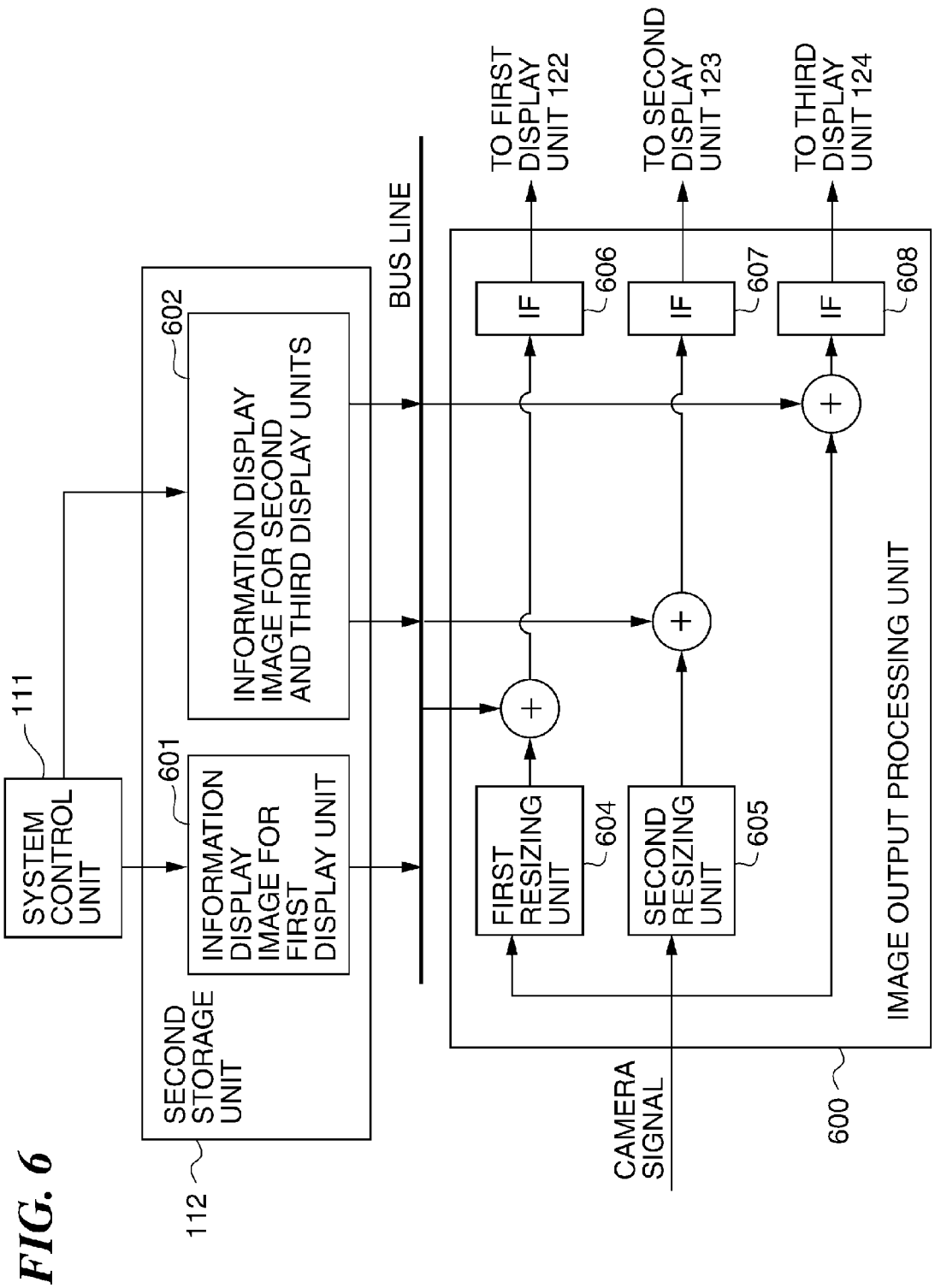
FIG. 6 is a block diagram schematically showing an arrangement of an image output processing unit according to a second embodiment, which the video control unit constituting the video camera appearing in FIG. 1 has.

FIG. 6 is a block diagram schematically showing an arrangement of the image output processing unit 600 according to the second embodiment, which the video control unit 115 has. A first resizing unit 604 and a second resizing unit 605 appearing in FIG. 6 are equivalent to the first resizing unit 204 and the second resizing unit 205, respectively, appearing in FIG. 2. Output I/Fs 606, 607, and 608 appearing in FIG. 6 are equivalent to the output I/Fs 206, 207, and 208, respectively, appearing in FIG. 2, and information display images 601 appearing in FIG. 6 are equivalent to the information display images 201 appearing in FIG. 2.

As distinct from the image output processing unit 200 according to the first embodiment, in the image output processing unit 600, information display images 602 to be displayed in a superimposed manner are images common to the second display unit 123 and the third display unit 124 and stored in the second storage unit 112. This is because the resolution of the second display unit 123 and the resolution of the third display unit 124 are an integral multiple or integral submultiple of each other, and therefore, information display images generated in the GHD size can be converted into the FHD size by simply doubling them both horizontally and vertically without the need to perform interpolation. Thus, commoditizing the information display images 602 eliminates the need to individually manage rendering of information display images for the second display unit 123 and the third display unit 124. For this reason, the storage capacity for information display images can be reduced, and moreover, the storage capacity can be reduced by commoditizing display parts data such as characters of sizes suited to resolutions.

Figure 7:
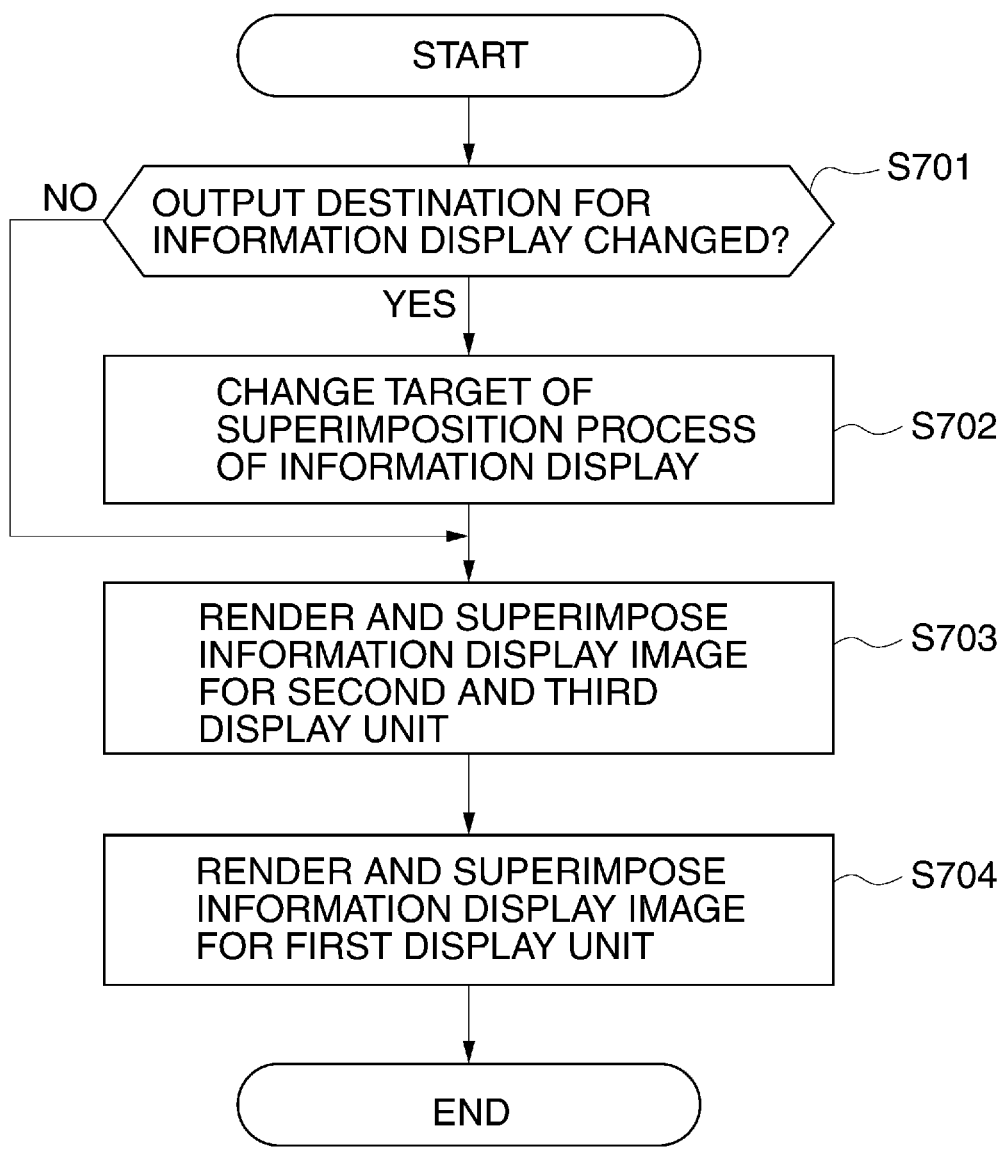
FIG. 7 is a flowchart of an information display image superimposed display process carried out by the image output processing unit appearing in FIG. 6.

FIG. 7 is a flowchart of an information display image superimposed display process carried out by the image output processing unit 600. The process in FIG. 7 is carried out at regular intervals when the video camera is operating in a shooting mode and images (through-the-lens images or camera signal images) taken by the image pickup device 102 are successively displayed on the first display unit 122 and a predetermined display unit. This process is realized by the system control unit 111 expanding a program, which is stored in ROM of the third storage unit 116, into work memory and executing the same to control operation of the image output processing unit 600.

First, in step S701, by referring to the third storage unit 116, the system control unit 111 determines whether or not an image output destination for information display images has been changed by a display on the previous output setting menu screen. When settings have been changed (YES in the step S701), the system control unit 111 proceeds to a process in step S702, and when settings have not been changed (NO in the step S701), the system control unit 111 proceeds to a process in step S703.

In the step S702, the system control unit 111 outputs information display images to a display unit, between the second display unit 123 and the third display unit 124, that has been configured to display information display images in a superimposed manner. The system control unit 111 does not output information display images to a display unit that has been configured not to display information display images in a superimposed manner. In step S703, the system control unit 111 performs rendering of the information display images 602 that are to be displayed in a superimposed manner on the second display unit 123 and the third display unit 124. Then, in step S704, the system control unit 111 performs rendering of information display images 701 for the first display unit 122 and then brings the process to an end.

It should be noted that if, on the output setting menu screen in FIG. 3, a choice that allows selection of "both the EVF and the external monitor" is added as an option of image output destinations for information display images, the process in FIG. 7 may be carried out, and if not, the process in FIG. 4 may be carried out. Moreover, after the step S701 and before the step S702, whether or not the first display unit 122 is closed may be determined. In this case, when the first display unit 122 is opened, the process proceeds to the step S702. On the other hand, when the first display unit 122 is closed, the first display unit 122 is exempted from destinations at which information display images are displayed in a superimposed manner, and both the second display unit 123 and the third display unit 124 are determined as destinations at which information display images are displayed in a superimposed manner. As a result, processing loads on the system control unit 111 can be lightened in a situation where the user cannot see a display screen due to the first display unit 122 being closed. On the other hand, the user can visually recognize the details of information display via the second display unit 123 or the third display unit 124.

Moreover, although in the embodiments described above, the video camera which is an exemplary image pickup apparatus is used as the image processing apparatus according to the present invention, the present invention is not limited to this. Namely, the present invention may be applied to electronic equipment having a camera, which takes images, and a plurality of image output destinations for displaying images being taken (a display and an output unit for an external display). For example, the present invention may be applied to various types of electronic equipment (a digital still camera, a personal computer, a PDA, a cellular phone unit, a game machine, and so on) having a camera.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-182543 filed Aug. 21, 2012, which is hereby incorporated by reference herein in its entirety.

What is claimed is:

1. An image processing apparatus comprising:
   an image pickup unit configured to take an image;
   a peep-type finder;
   a display unit which is provided in a part other than inside the peep-type finder;
   an output unit configured to resize the image, which is taken by said image pickup unit, into images with resolutions corresponding to respective resolutions of three or more image output destinations including the display unit and output the images to the three or more image output destinations at the same time;
a superimposition unit configured to individually superimpose shooting information in the resolutions corresponding to the respective resolutions of the three or more image output destinations on the images output to the respective three or more image output destinations;
a selection unit configured to select an image output destination, on which the shooting information is to be superimposed, from among a plurality of image output destinations except the display unit among the three or more image output destinations; and
a control unit configured to provide control such that said superimposition unit superimposes the shooting information on the image output to the display unit and the image output to the image output destination selected by said selection unit, said output unit outputs the same, and that said output unit outputs the image to an image output destination that has not been selected by said selection unit without superimposing the shooting information on the image.

2. The image processing apparatus according to claim 1, wherein said selection unit inhibits selection of at least one of the plurality of image output destinations except the display unit among the three or more image output destinations.

3. The image processing apparatus according to claim 1, wherein when said control unit controls said output unit so as not to output the image to the display unit, said control unit provides control such that said superimposition unit superimposes the shooting information on the image output to at least one of the image output destinations that has not been selected by said selection unit from among the plurality of image output destinations except the display unit among the three or more image output destinations, and said output unit outputs the image.

4. The image processing apparatus according to claim 1, further comprising:
another display which is provided inside the peep-type finder,
wherein the three or more image output destinations includes the other display.

5. The image processing apparatus according to claim 1, further comprising:
an interface configured to output the image to an external monitor,
wherein the three or more image output destinations includes the external monitor.

6. The image processing apparatus according to claim 1, wherein said superimposition unit superimposes the common shooting information on the image output to the plurality of image output destinations except the display unit among the three or more image output destinations, and
said selection unit is allowed to select whether to cause said superimposition unit to superimpose the common shooting information on the plurality of image output destinations except the display unit among the three or more image output destinations.

7. The image processing apparatus according to claim 6, wherein said superimposition unit superimposes, on the images output to each of the plurality of image output destinations except the display unit among the three or more image output destinations, the shooting information in different sizes that are integral multiples of sizes of the shooting information according to the respective resolutions.

8. The image processing apparatus according to claim 6, wherein the common shooting information has the same resolution.

9. The image processing apparatus according to claim 8, wherein the shooting information is laid out so as to be displayed along two sides between which there is a display reference point of each of the plurality of image output destinations except the display unit among the three or more image output destinations, and not to be displayed along other sides of each of the plurality of image output destinations.

10. A control method for an image processing apparatus having an image pickup unit that takes an image, a peep-type finder, a display unit that is provided in a part other than inside the peep-type finder, and an output unit that outputs the images to three or more image output destinations including the display unit, the control method comprising:
a selection step of selecting an image output destination, on which shooting information is to be superimposed, from among a plurality of image output destinations except the display unit among the three or more image output destinations;
an output step of resizing the image, which is taken by the image pickup unit, into images with resolutions corresponding to respective resolutions of the three or more image output destinations and outputting the images to the three or more image output destinations at the same time;
a superimposition step of individually superimposing shooting information in the resolutions corresponding to the respective resolutions of the display unit and the image output destination selected in said selection step on the images output to respective ones of the display unit and the image output destination selected in said selection step; and
a control step of providing control such that in said superimposition step, the shooting information is superimposed on the image output to the display unit and the image output to the image output destination selected in said selection step, and the images with the shooting information is superimposed thereon are output, and that the image is output to an image output destination that has not been selected in said selection step without superimposing the shooting information on the image.

11. A non-transitory computer-readable storage medium storing a program for causing a computer to implement a control method for an image processing apparatus having an image pickup unit that takes an image, a display unit that is not provided inside a peep-type finder, and an output unit that outputs the images to three or more image output destinations including the display unit, the control method comprising:
a selection step of selecting an image output destination, on which shooting information is to be superimposed, from among a plurality of image output destinations except the display unit among the three or more image output destinations;
an output step of resizing the image, which is taken by the image pickup unit, into images with resolutions corresponding to respective resolutions of the three or more image output destinations and outputting the images to the three or more image output destinations at the same time;
a superimposition step of individually superimposing shooting information in the resolutions corresponding to the respective resolutions of the display unit and the image output destination selected in the selection step on the images output to respective ones of the display unit and the image output destination selected in the selection step; and
a control step of providing control such that in the superimposition step, the shooting information is superimposed on the image output to the display unit and the image output to the image output destination selected in the selection step, and the images with the shooting information is superimposed thereon are output, and that the image is output to an image output destination that has not been selected in the selection step without superimposing the shooting information on the image.

12. An image processing apparatus comprising:
an image pickup unit configured to take an image;
a display unit;
an output unit configured to output the image to three or more image output destinations including the display unit, the output unit resizing the image when the image is output to an image output destination for which the image is needed to be resized and outputting images with resolutions corresponding to respective resolutions of the three or more image output destinations to the three or more image output destinations;
a superimposition unit configured to individually superimpose shooting information in the resolutions corresponding to the respective resolutions of the three or more image output destinations on the images output to the respective three or more image output destinations;
a selection unit configured to select an image output destination, on which the shooting information is to be superimposed, from among a plurality of image output destinations except the display unit among the three or more image output destinations; and
a control unit configured to provide control such that the superimposition unit superimposes the shooting information on the image output to the display unit and the image output to the image output destination selected by the selection unit, the output unit outputs the same, and that the output unit outputs the image to an image output destination that has not been selected by the selection unit without superimposing the shooting information on the image.

13. The image processing apparatus according to claim 12, wherein the selection unit inhibits selection of at least one of the plurality of image output destinations except the display unit among the three or more image output destinations.

14. A control method for an image processing apparatus having an image pickup unit that takes an image, a display unit, and an output unit that outputs the image to three or more image output destinations including the display unit, the control method comprising:
a selection step of selecting an image output destination, on which shooting information is to be superimposed, from among a plurality of image output destinations except the display unit among the three or more image output destinations;
an output step of resizing the image when the image is output to an image output destination for which the image is needed to be resized and outputting images with resolutions corresponding to respective resolutions of the three or more image output destinations to the three or more image output destinations;
a superimposition step of individually superimposing the shooting information in the resolutions corresponding to the respective resolutions of the three or more image output destinations on the images output to the respective three or more image output destinations; and
a control step of providing control such that the superimposition step superimposes the shooting information on the image output to the display unit and the image output to the image output destination selected in the selection step, the output step outputs the same, and that the output step outputs the image to an image output destination that has not been selected in the selection step without superimposing the shooting information on the image.

15. A non-transitory computer-readable storage medium storing a program for causing a computer to implement a control method for an image processing apparatus having an image pickup unit that takes an image, a display unit, and an output unit that outputs the image to three or more image output destinations including the display unit, the control method comprising:
a selection step of selecting an image output destination, on which shooting information is to be superimposed, from among a plurality of image output destinations except the display unit among the three or more image output destinations;
an output step of resizing the image when the image is output to an image output destination for which the image is needed to be resized and outputting images with resolutions corresponding to respective resolutions of the three or more image output destinations to the three or more image output destinations;
a superimposition step of individually superimposing the shooting information in the resolutions corresponding to the respective resolutions of the three or more image output destinations on the images output to the respective three or more image output destinations; and
a control step of providing control such that the superimposition step superimposes the shooting information on the image output to the display unit and the image output to the image output destination selected in the selection step, the output step outputs the same, and that the output step outputs the image to an image output destination that has not been selected in the selection step without superimposing the shooting information on the image.

* * * * *